US007633491B2

(12) United States Patent
Okamoto (10) Patent No.: US 7,633,491 B2
(45) Date of Patent: Dec. 15, 2009

(54) APPARATUS FOR EFFECTING DISPLAY AND INPUT

(75) Inventor: Hideaki Okamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 574 days.

(21) Appl. No.: 10/552,977

(22) PCT Filed: Dec. 22, 2004

(86) PCT No.: PCT/JP2004/019708

§ 371 (c)(1),
(2), (4) Date: Jul. 17, 2006

(87) PCT Pub. No.: WO2005/062162

PCT Pub. Date: Jul. 7, 2005

(65) Prior Publication Data

US 2006/0262098 A1    Nov. 23, 2006

(30) Foreign Application Priority Data

Dec. 24, 2003    (JP)    ............... 2003-426183

(51) Int. Cl.
*G06F 3/041*    (2006.01)
*G06F 1/16*    (2006.01)
*G09G 5/00*    (2006.01)

(52) U.S. Cl. ............... 345/173; 345/156; 361/679.05

(58) Field of Classification Search ......... 345/156–173; 361/682, 683
See application file for complete search history.

(56) References Cited

U.S. PATENT DOCUMENTS

| 5,396,443 A | 3/1995 | Mese et al. |
| 5,909,382 A | 6/1999 | Neoh et al. |
| 6,130,774 A | 10/2000 | Albert et al. |
| 6,762,929 B2 * | 7/2004 | Sawyer .................. 361/679.05 |
| 7,226,278 B2 * | 6/2007 | Nason et al. ............. 417/410.1 |
| 7,324,093 B1 * | 1/2008 | Gettemy et al. ............. 345/173 |
| 2004/0201579 A1 * | 10/2004 | Graham ...................... 345/175 |
| 2006/0017692 A1 * | 1/2006 | Wehrenberg et al. ........ 345/156 |
| 2006/0157659 A1 * | 7/2006 | MacGregor et al. ........... 251/11 |

FOREIGN PATENT DOCUMENTS

| DE | 202 00 930 | 6/2002 |
| JP | 11-109880 | 4/1999 |
| JP | 2001-282442 | 10/2001 |
| WO | 0 716 390 | 6/1996 |
| WO | 0 740 266 | 10/1996 |
| WO | WO 00/25193 | 5/2000 |

* cited by examiner

*Primary Examiner*—Sumati Lefkowitz
*Assistant Examiner*—Charles Hicks
(74) *Attorney, Agent, or Firm*—Fitzpatrick, Cella, Harper & Scinto (57) ABSTRACT

In an apparatus for effecting at least one of display and input, a sheet-like member is designed so that it has rigidity only when the rigidity is required for input or display and can be bent or rolled at other times. An apparatus 100 capable of effecting at least one of display and input includes a flexible sheet-like member 200 which effects at least one of display and input. The apparatus 100 further includes rigidity adjusting means for at least partially changing rigidity of the sheet-like member as desired.

10 Claims, 9 Drawing Sheets

APPARATUS FOR EFFECTING DISPLAY AND INPUT

TECHNICAL FIELD

The present invention relates to an apparatus for effecting at least one of display and input. More specifically, the present invention relates to a display apparatus including a display portion and an input portion which are integrated with each other and a pen-type tool, capable of handwriting input, provided to the input portion.

BACKGROUND ART

Heretofore, there have been proposed various apparatuses of electromagnetic transfer type (electromagnetic induction type), a resistive film type, an ultrasonic type, etc. Of these apparatuses, the electromagnetic induction type apparatuses have been proposed in European Patent Applications Nos. EP0716390A1, and EP0740266A2, in which a position detection surface at which a plurality of loop coils are arranged in parallel and a position indicator such as a pen or a cursor are employed, and the loop coils are used as sensors, i.e., antennas and arranged in an X-direction and a Y-direction at a pair of sensor surfaces orthogonal to each other and utilize a magnetic interaction with a coil or a resonant circuit incorporated in the position indicator (pen) to transfer an electromagnetic wave therebetween, so that on the basis of a detected signal, a coordinate and other information on the position indicator are detected. The sensor substrate on which the loop coils (antennas) are disposed on the back side of a liquid crystal panel, and the pen is moved on the front surface of the liquid crystal panel, so that a position of the pen is detected and a trail of the moved pen can be displayed on the liquid crystal picture area.

On the other hand, in recent years, as a display screen, electronic papers of an electro-luminescent (EL) type or an electrophoretic type described in U.S. Pat. No. 6,130,774 have been proposed. In these electronic papers, it is possible to provide flexibility to the entire display apparatuses by development of an organic EL material or an organic thin film transistor (TFT). As a result, it becomes possible to realize a so-called flexible display which is thin and can be bent and curled.

In the above described electromagnetic type apparatus, it is also possible to form the sensor substrate, provided with the loop coils, of a material consisting of a polyimide film having a thickness of, e.g., about 0.4 mm. As a result, the sensor substrate also has flexibility. Accordingly, it is possible to realize a display apparatus provided with a pen input tool by using various electronic papers (of EL type or electrophoretic type) and the electromagnetic induction type apparatus in combination. The resultant display apparatus can be bent or rolled when it is carried or held.

However, such a pen input type display apparatus has accompanied with the following problems.

In the case where the pen input is performed in such a state that the pen input type display apparatus is held with hand, not placed on a desktop, an input surface portion is deformed due to flexibility of the apparatus when a pen is moved on the input surface portion. As a result, it is impossible to input a character or a graphic pattern in a desired shape. In this regard, it is also possible to effect input with such a force that the input surface is not deformed by lowering the pen pressure. However, even in such a case, it is difficult to input the character or graphic pattern in the desired shape. The input can be performed when the pen input display apparatus is placed on a hard or rigid underlay such as a book. However, carrying of the underlay at all times is very troublesome.

Further, even when the pen input display apparatus is used as a flexible display, flexibility thereof at all times causes an inconvenience in some cases.

DISCLOSURE OF THE INVENTION

An object of the present invention is to provide an apparatus having solved the above described problems.

According to the present invention, there is provided an apparatus for effecting at least one of display and input, comprising: a flexible sheet-like member for effecting at least one of display and input, and a rigidity adjusting means for changing at least partially a rigidity of the flexible sheet-like member, as needed.

The sheet-like member may be designed so that an input portion and an display portion thereof overlap each other to provide an integral portion when viewed from a direction of a user's line of sight (FIG. 2), that the input portion and the display portion can have an area ratio, therebetween in the sheet plane, which is a predetermined ratio or a variable ratio (FIG. 9(c)), and that the sheet-like member can be subjected to either one of display and input (FIG. 9(a), 9(b)).

The rigidity adjusting means may comprise a control portion and a rigidity adjusting member attached to the sheet-like member. The sheet-like member is formed of a variable-rigidity material (a material which can be variable changed in rigidity). In this case, the variable-rigidity member may be formed of a shape-memory material which may be any material so long as it has flexibility at an ordinary temperature and can be provided with rigidity by control. Examples of the shape-memory material may include Ti—Ni based alloys; Cu-based alloys including Cu—Zn—Al based alloys and Cu—Au—Ni based alloys; and polymer-containing materials. At least a shape-memory material containing Ti—Ni alloy is electrically connected with the control portion and rigidity is controlled by energizing or non-energizing the shape-memory material. Alternatively, a shape-memory material heating means is provided and turned on and off by the control portion to control rigidity. For example, when input to the apparatus is performed in such a state that there is no hard or rigid member on the back side of the apparatus, rigidity control is effected to impart rigidity to the shape-memory material, thus providing the apparatus with necessary rigidity with a minimum power consumption.

The variable-rigidity member may also function as a support portion of TFT for driving the display portion. In this case, the resultant apparatus can be made thinner and also can be reduced in the number of structural members, thus being reduced in manufacturing cost. The variable-rigidity member may be integrally formed with the sheet-like member or formed so as to back the sheet-like member therewith.

The apparatus may further comprise first detection means for detecting a state of the apparatus, and the rigidity adjusting means is not controlled to ensure rigidity necessary for the apparatus unless the detection means at least detects that the apparatus is not placed on a surface having a certain degree of rigidity in a flexible state, or may further comprise second detection means for detecting start of input, and the rigidity adjusting means is not controlled to ensure rigidity necessary for the apparatus unless the second detection means at least detects start of input in a flexible state.

In this case, when the above described detection is performed by the first detection means or the second detection means, the rigidity necessary for the apparatus can be ensured by controlling the rigidity adjusting means. In a preferred embodiment, when the first detection means detect that the apparatus is not placed on the rigid surface and the second detection means detects that input with input means is started, the rigidity necessary for the apparatus is ensured by controlling the rigidity adjusting means.

Further, the apparatus may further comprise third detection means for detecting stop of input, and the rigidity adjusting means is controlled to return and apparatus in a flexible state when the third detection means detects stop of input in such a state that rigidity necessary for the apparatus is ensured.

The apparatus may further comprising timing means for controlling timing of either one or both of ensuring and less of rigidity necessary for the apparatus, whereby a predetermined control can be performed at the time when a predetermined time has elapsed from each of the detections described above.

The first detection means may detect a state of the apparatus to control the rigidity adjusting means depending on a change in detection result even during input.

The apparatus may further comprise control portion operation means for permitting a user to operate a control portion, and rigidity of the apparatus is controllable by operating the control portion operation means by the user, as needed.

The rigidity adjusting means may comprise a movable mechanism which can be placed in such a state that it does not impair flexibility of the apparatus and is movable in an area capable of at least partially ensure rigidity of the sheet-like member, as needed, whereby it is possible to obtain rigidity by operating the rigidity adjusting means constituted by a link etc., as desired, by the user.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 9(a), 9(b) and 9(c) are views showing embodiments of the input display apparatus of the present invention, wherein FIG. 9(a) illustrates n input portion and a display portion which are separated from each other, FIG. 9(b) illustrates the input portion and the display apparatus which are connected with a (personal) computer, and FIG. 9(c) illustrate an input display apparatus.

BEST MODE FOR CARRYING OUT THE INVENTION

Hereinbelow, the present invention will be described based on embodiments in which the input display apparatus is applied to electronic paper. However, the present invention is not limited thereto but may be applicable to other apparatuses and techniques including appropriate combination of the embodiments described below and those to be embraced in the scope of the present invention.

FIRST EMBODIMENT

In this embodiment, electronic paper including integrally an input portion and a display portion and employing an electromagnetic induction type pen input scheme will be described as an example.

Figure 1:
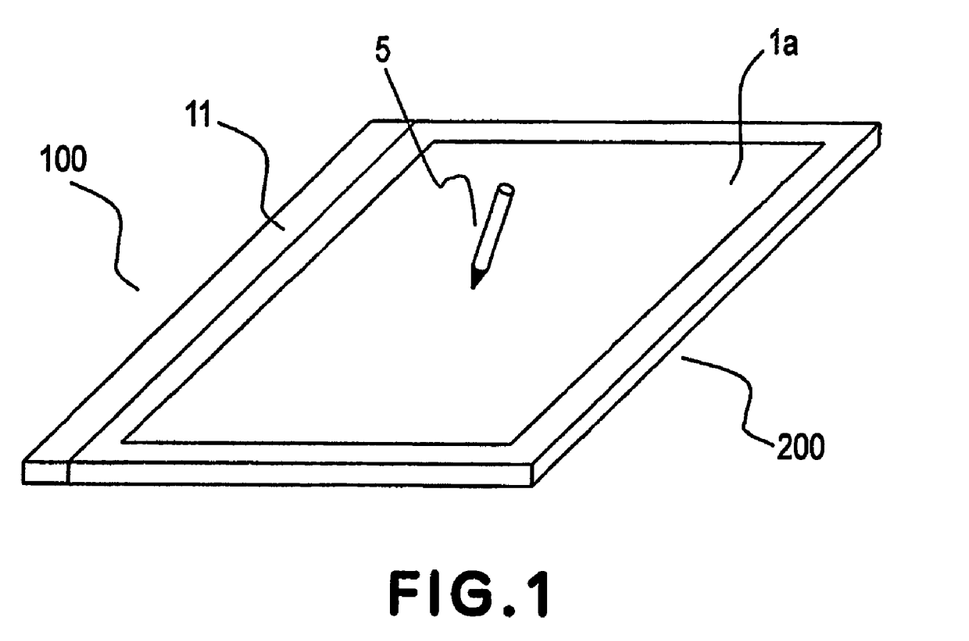
FIG. 1 is a perspective view of an embodiment of an input display apparatus according to the present invention.

FIG. 1 shows a perspective view of a pen input display apparatus (electronic paper) 100 in this embodiment of the present invention.

The apparatus 100 includes a display surface 1a, of the electronic paper, on which input trail described later and data from a memory provided in the apparatus 100, a memory detachably mountable to the apparatus 100, or external equipment, such as a computer, connected to the apparatus 100 are displayed. In FIG. 1, interfaces for the memories and the external equipment are not shown.

The display surface 1a also functions as a pen input surface and in this embodiment, the electromagnetic induction type pen input scheme described above is employed.

Figure 2:
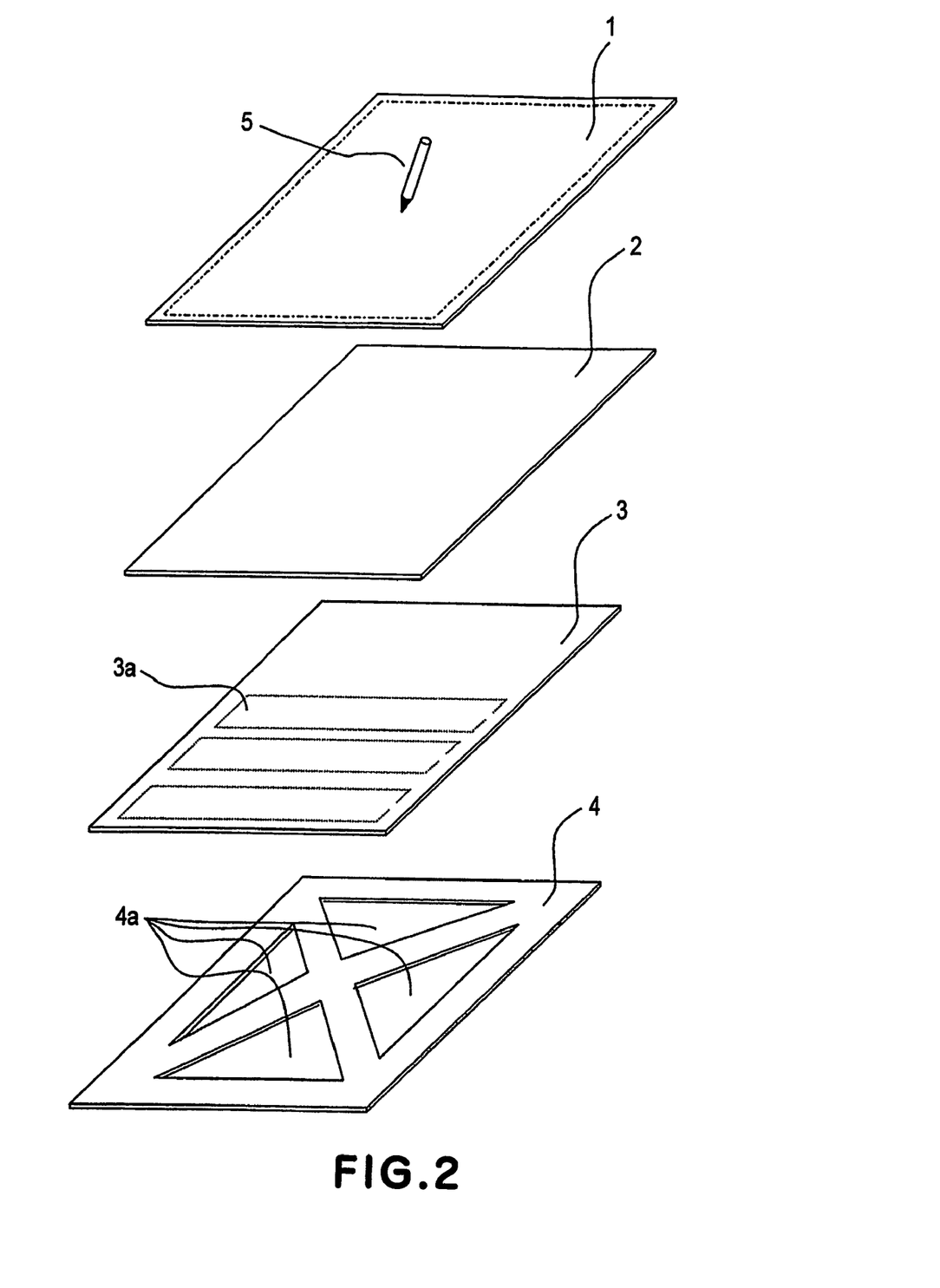
FIG. 2 is an exploded perspective view of an embodiment of the input display apparatus of the present invention.

At a rear surface (opposing from the display surface 1a) of the apparatus 100, a sensor substrate 3, comprising loop coils is disposed (FIG. 2). An input pen 5 comprises a coil and a substrate which are disposed therein. A position and a trail of the pen 5 are detected by transferring an electromagnetic wave between the pen 5 and the sensor substrate 3. A pen point of the pen 5 is provided with a switch which is placed in an ON-state when the pen point contacts the input surface (display surface) 1a. When the pen is moved on the input surface in the contact state, a detected trail is treated through an unshown control portion in the pen input display apparatus 100 and a voltage applied to respective gate electrodes of a thin film transistor (TFT) substrate for driving the electronic paper display portion is controlled to permit real-time display as described later.

A control box 11 holds therein a battery, the electronic paper display surface 1a, the electromagnetic induction means, and a control substrate for a frame (variable rigidity member) 4 described later and may be designed so as to be detachably mountable to a display and input portion 200 including the display surface 1a via a connector or provide an integral structure with the display and input portion 200.

A display mechanism of the electronic paper is particularly not limited so long as it can be flexibly modified as in particle movement type display apparatuses using an organic electroluminescence (EL) device, a liquid crystal device (LCD), a cholesteric liquid crystal device, an electrophoretic display device, and a toner display.

The display (pen input) portion is driven by the battery but may be driven by an AC power source. It is preferable that the display portion may be driven by both of the battery and the AC power source. A size of the display surface 1a is not particularly restricted. However, when the size is not larger than approximately A3 size, the resultant apparatus is light weight and excellent in portability.

FIG. 2 shows an exploded perspective view of principal structural members constituting the pen input display apparatus 100.

Referring to FIG. 2, the apparatus 100 includes an electronic paper display portion 1 having the display surface 1a and containing therein the display mechanism, a TFT substrate 2 for driving the electronic paper display portion, an electromagnetic induction sensor substrate 3 constituting the input portion, and a frame 4 constituting a variable rigidity member. These members 1-4 are successively superposed and fixed at principal portions with an unshown fixing means. In FIG. 2, wiring portions between a control substrate for, e.g., the display portion 1 and the respective portions are omitted.

The display portion 1 of the electronic paper comprises a thin film having a thickness of about 1 mm. The TFT substrate 2 is formed of a thin flexible material as a base material. Examples of the material may include plastic films, such as those of polyester, polycarbonate, poly(ethersulfone), and thin metal plates, such as those of stainless steel and aluminum. The sensor substrate 3 comprises an about 0.4 mm-thick polyimide film, as a base material, on which an antenna pattern is formed. A part of the antenna pattern is indicated by 3a in FIG. 2. A part of the antenna pattern is indicated by 3a in FIG. 2. The frame 4 is formed of a thin plate-like material, such as Ti—Ni alloy, and is connected with the control substrate described above. The frame 4 is provided with openings 4a for weight reduction. The openings 4a are provided within the limit of ensuring of necessary rigidity.

All the display pattern 1, the TFT substrate 2, the sensor substrate 3, and the frame 4 of the electronic paper have such a flexibility that they are readily bent. However, a shape memory material such as Ti—Ni alloy for the frame 4 has a property of memorizing its shape so that the display portion 1 of the pen input display apparatus 100 haws a planar surface, thus being placed in a very flexible state at room temperature. An exterior component of these members is not shown. However, by accommodating these members within a thin flexible film-like plastic member, the resultant pen input display apparatus 100 has such flexibility that it is readily bendable except when rigidity thereof is required.

Figure 3:
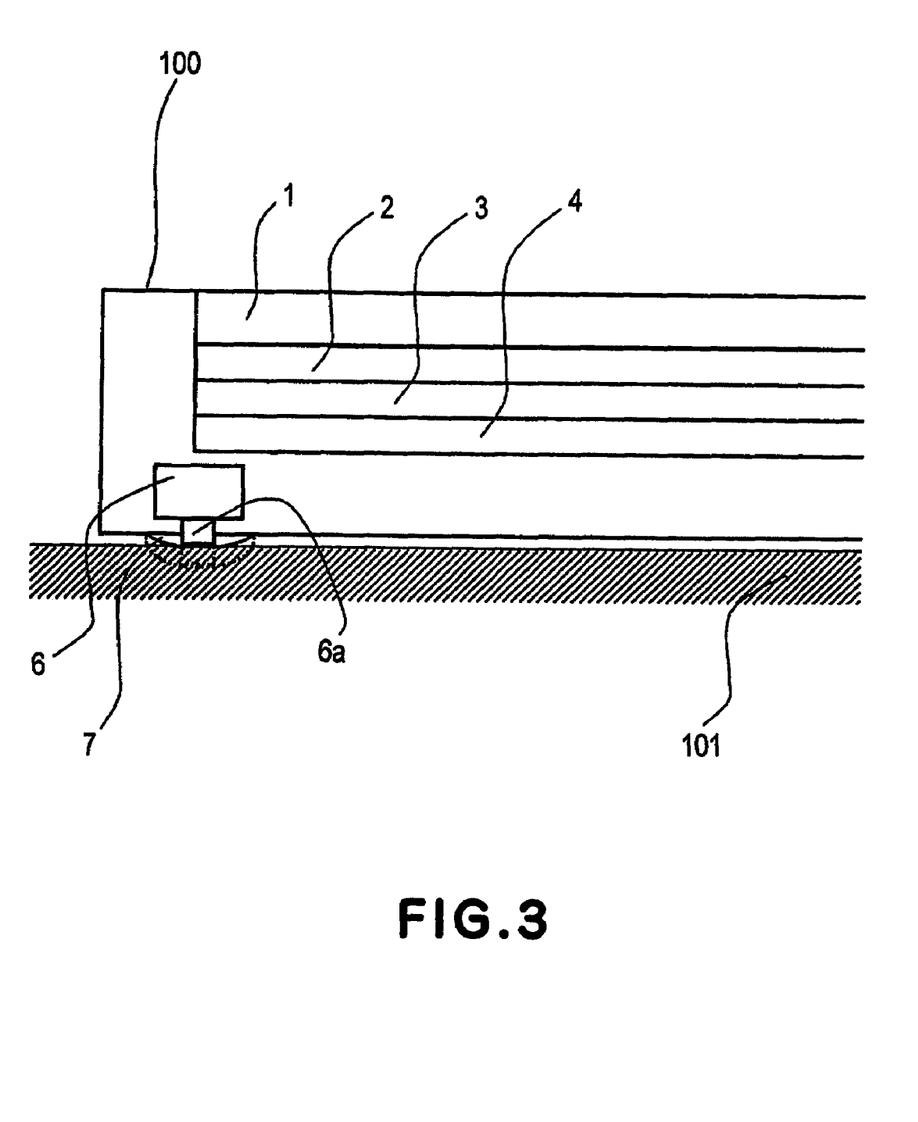
FIG. 3 is a sectional view of an embodiment of the input display apparatus of the present invention.

FIG. 3 shows a sectional view of a principal portion of the pen input display apparatus 100 of this embodiment when the display apparatus is placed on a desk.

In FIG. 3, the display apparatus 100 is provided with 2 to 4 microswitches 6 at its back surface. Each of the microswitches 6 has an actuator portion 6a which is covered with an elastic member 7 such as a thin rubber. The microswitch 6 is located at such a position that it contacts a desk 101 to be pushed down when the display apparatus 100 is placed on the desk. The position indicated by a dotted line in FIG. 3 is an ordinary position of the actuator portion 6a and the elastic member 7 before they are pushed down.

The microswitch 6 constitutes a first detection means which detects whether the pen input display apparatus 100 is placed on the desk or not. It is also possible to constitute the first detection means with another means other than the microswitch 6. For example, the first detection means may be constituted by a combination of an actuator with a photosensor. In this case, the actuator is ordinarily urged outside a detection area of the photosensor by a spring, so that when the apparatus is placed on the desk, the actuator is moved into the detection area while opposing the force of spring. As a result, the photosensor detects that the pen input display apparatus 100 is placed on the desk.

Further, it is also possible to constitute the first detection means only with a light-receiving sensor which is disposed on the back side of the pen input display apparatus 100 and a light-receiving surface of which is exposed to the outside the apparatus. In this case, when the apparatus is held and used with hands, the light-receiving sensor receives external light unless the light-receiving sensor portion is blocked by the light. When the apparatus 100 is placed on the desk, a sufficient amount of light does not reach the light-receiving sensor, so that the apparatus 100 is judged to be placed on the desk. Further, it is also possible to constitute the first detection means with a piezoelectric element. In this case, the piezoelectric element is disposed at a contact portion between the pen input display apparatus 100 and the desk 101 and the apparatus 100 is judged to be placed on the desk 101 on the basis of a voltage generated when the apparatus is placed on the desk to deform the piezoelectric element.

Figure 4:
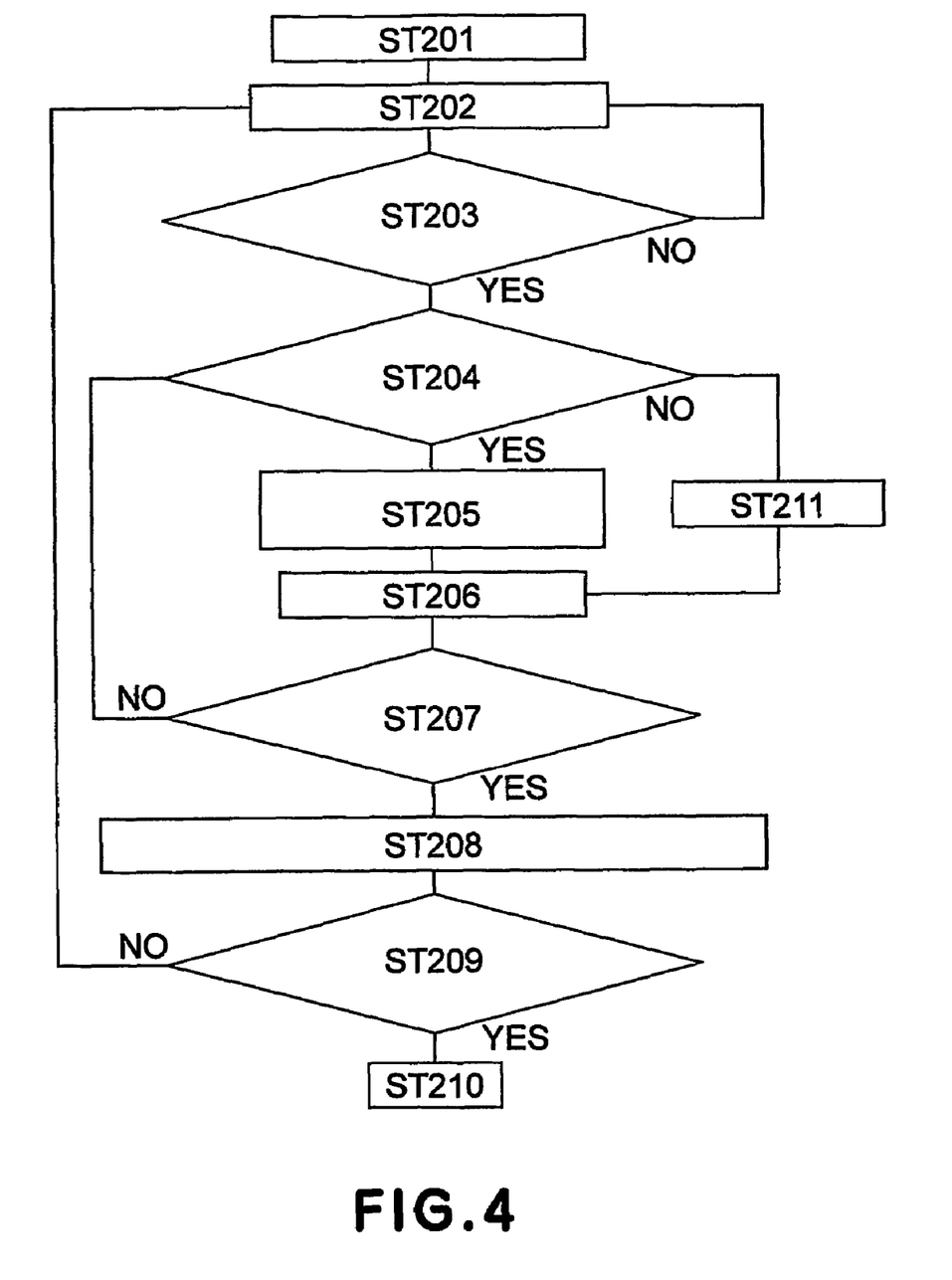
FIG. 4 is a flow chart with respect to an embodiment of the input display apparatus of the present invention.

Next, an operation during the above-described pen input in this embodiment will be described. A flow chart thereof is shown in FIG. 4.

First of all, when a user turns on the power of the pen input display apparatus 100, data and displayed on the electronic paper display portion 1 (ST201). In this embodiment, however, the electronic paper has a memory effect, so that the display state of the finally displayed data is held as it is for a certain period of time even in the power-off state.

When the power is turned on as described above, the sensor substrate 3 is also placed in a standby state capable of detecting the input pen 5 (ST202). In this state, when the input pen 5 is brought near to the input surface (the sensor substrate 3) and located at a position within a certain distance from the input surface, an icon is displayed at a position on the display surface 1a immediately under the input pen 5. This is in association with the second detection means described later. In this embodiment, the pen input cannot be performed yet in such a state. When the pen point contacts the picture area (display screen) 1a, the switch at the pen point is turned on and, when the input pen 5 is moved while contacting the display surface 1a, a trail of the input pen 5 is not brought near to the input surface (sensor substrate 3), the apparatus is still kept in the standby state (ST203).

At that time, when the pen input display apparatus 100 is placed on the desk 101 and the microswitch 6 on the back side of the apparatus is pushed down, the apparatus is recognized that it is located on the desk (ST204). At this time, when the frame 4 has already been energized, the energization is stopped (ST205).

In such a state that the pen input display apparatus 100 is not placed on the desk or the like, e.g., in such a state that the user holds the apparatus 100 with one hand in a standing position and performs pen input, the microswitch 6 is not pushed down. As a result, the apparatus 100 is recognized that it is not placed on the desk (ST204). When the pen input is performed in such a state, the frame 4 of, e.g., Ti—Ni alloy is energized (ST211). By the energization, the Ti—Ni alloy or the like generates resistance heat to increase Young's modulus. As a result, the frame 4 losses its flexibility to be returned to a memorized shape, i.e., such a shape that the display screen 1a provides a planar surface. For this reason, the apparatus 100 is placed in such a state that it becomes flat and display thereof is ensured. As described above, it becomes possible to obtain the display, so that even when the pen input is performed in such a state that the apparatus 100 is held with one hand, the apparatus 100 is not deformed by a pen pressure. As a result, it becomes possible to effect the pen input at an ordinary pen pressure.

In this embodiment, as described above, before energization of the frame 4 of Ti—Ni alloy etc., the second detection means detects start of pen input. Timing of the detecting may preferably be Times (1) to (10) described below. This is indicated by ST203 in the flow chart shown in FIG. 4 and in this embodiment, Time (1) blow is employed as an example.

Time (1): A point of time when the sensor substrate 3 and the input pen 5 are used as the second detection means and the input pen 5 enters the detectable area of the sensor substrate 3.

Time (2): A point of time when the switch of the point of input pen 5, the input surface, and the sensor substrate 3 are used as the second detection means and the input pen 5 contacts the picture area (display screen) 1$a$ to turn the switch on.

Time (3): A point of time when either one of the input pen 5 and an unshown cradle is provided with an optical sensor, a mechanical switch, etc., and release of the input pen 5 from the cradle is detected in the case where the pen input display apparatus 100 is a product including the input pen 5 and the cradle, for holding the input pen 5, which are used as the second detection means.

Time (4): A point of time when a predetermined time has elapsed from detection of the input pen 5 as described in Times (1) to (3) in the case where the second detection means is constituted similarly as in Times (1) to (3) and the pen input display apparatus 100 is provided with a timing means (timer).

In the above described structures. the rigidity adjusting means is controlled to ensure the rigidity necessary for input by the display apparatus when the first detection means detects that the display apparatus is not placed on a rigid surface and the second detection means detects that input with the input means is started or that a predetermined time has elapsed from the detection. For this reason, the user can obtain rigidity with no particular operation when the user performs pen input in such a state that there is no hard or rigid member on the back side of the display apparatus.

In the above described timing (Times (1) to (4)), the respective states are detected and corresponding control is performed semiautomatically. However, as described with respect to Time (5) below, the user may operate an operation portion as needed irrespective of a state in which the pen input display apparatus 100 is placed or a state of the input pen 5. Further, Times (5) may appropriately be combined with the above described Times (1) to (4). In the case of combination of Times (1) to (5), an operation at Time (5) by user's intention has priority.

Time (5): A point of time when the input pen 5 contacts a portion of an icon of "pen input start" displayed on the display screen 1$a$ or when a pen input switch disposed outside the display portion is turned on.

According to the detection at Time (5), the user operates a control polymer operation means capable of operating the control polymer by the use, as desired, thereby to control rigidity. For this reason, irrespective of the apparatus state, it is possible to ensure the rigidity when the user judges and return the apparatus to the original flexible state.

Thereafter, when the input pen 5 is moved while contacting the display surface 1$a$, an electromagnetic wave is transferred between the sensor substrate 3 and the input pen 5 and the position of the pen point of the input pen 5 is detected through an unshown control portion for electromagnetic induction. As a result, a trail of the input pen 5 is displayed on the display surface 1$a$ through the control portion for the electronic paper (ST206). During this operation, the output of the microswitch 6 on the back side of the apparatus is still monitored by the electronic paper control portion (ST207 to ST204).

During this monitoring operation, when the pen input is initially performed in such a state that the pen input display apparatus 100 is held with one hand and the microswitch 6 is pushed down in such a state that the apparatus 100 is placed on the desk during the pen input operation, energization of the frame 4 is terminated. At this time, the energization may be terminated immediately as soon as the microswitch 6 is turned on but may be terminated after the lapse of predetermined time sine it is also considered that the user holds the apparatus in the hand immediately again. This operation is indicated in FIG. 4 as ST205. In ST205 of FIG. 4, the case of terminating the energization immediately is shown as an example.

According to the above described operation, even when the input to the input portion by the input means is performed, the first detection means detects the state of the display apparatus and controls the rigidity adjusting means depending on a change in detection result. As a result, during the input, it is possible to timely control the rigidity depending on a change in state by detecting such a change in state that a presence state in which these is a hard or rigid member on the back side of the detection means is changed to its absence state or the absence state is changed to the presence state.

When the pen input is completed, the energization of the frame 4 is stopped (ST208). As a result, Young's modulus of the Ti—Ni alloy or the like is lowered, whereby the pen input display apparatus 100 is returned to the flexible state. The completion of the pen input operation is detected by a third detection means. The timing thereof may be any one of the following Times (6) to (10) described below. This is indicated by ST207 in the flow chart shown in FIG. 4 and in this embodiment, Time (6) blow is employed as an example.

Time (6): A point of time when the sensor substrate 3 and the input pen 5 are used as the third detection means and the input pen 5 enters the detectable area of the sensor substrate 3.

Time (7): A point of time when the switch of the point of input pen 5, the input surface, and the sensor substrate 3 are used as the third detection means and the input pen 5 contacts the picture area (display screen) 1$a$ to turn the switch on.

Time (8): A point of time when either one of the input pen 5 and an unshown cradle is provided with an optical sensor, a mechanical switch, etc., and release of the input pen 5 from the cradle is detected in the case where the pen input display apparatus 100 is a product including the input pen 5 and the cradle, for holding the input pen 5, which are used as the third detection means.

Time (9): A point of time when a predetermined time has elapsed from detection of the input pen 5 as described in Times (6) to (8) in the case where the third detection means is constituted similarly as in Times (6) to (8) and the pen input display apparatus 100 is provided with a timing means (timer).

In the above described structures, the rigidity adjusting means is controlled to return the display apparatus to the flexible state when the third detection means detects that the input is completed or that a predetermined time has elapsed from the detection. For this reason, the user can return the display apparatus to the original flexible state without effecting a particular operation.

The second detection means and the third detection means may be the same detection means.

As described with respect to Time (10) below, the pen input may be completed by user's operation. Further, Times (10) may appropriately be combined with the above described Times (6) to (9). In the case of combination of Times (6) to (10), an operation at Time (10) by user's intention has priority.

Time (10): A point of time when the input pen 5 contacts a portion of an icon of "pen input start" displayed on the display screen 1a or when a pen input switch disposed outside the display portion is turned off.

Thereafter, when the input operation is completed as it is, the power of the pen input display apparatus 100 is turned off to complete the use of the apparatus (ST209 to ST210). When the use of the apparatus is resumed, the power is retained as it is and the apparatus is returned to the standby state (ST209 to ST202).

Incidentally, also even when the pen input display apparatus 100 is not placed on the desk but is held with one hand together with a hard or rigid member as an underlay, the microswitch 6 on the back side of the apparatus is pushed down, so that the frame 4 is not energized. As a result, it is possible to perform the pen input in such a state that the pen input display apparatus 100 per se is still flexible. In this case, the input can be performed not only with no problem but also without energizing the frame 4, thus being capable of reducing power consumption.

SECOND EMBODIMENT

In the above embodiment, the Young's modulus is changed by energizing the Ti—Ni alloy or the like of the frame 4, but in this embodiment, a pen input display apparatus 100 is prepared in the same manner as in First Embodiment except that rigidity of the apparatus 100 is controlled by heating the Ti—Ni alloy or the like with a heater provided in the apparatus 100.

THIRD EMBODIMENT

In the above embodiments, the TFT substrate 2 is formed of the plastic film (e.g., those of polyester, polycarbonate, poly(ethylsulfone), etc.) or the thin metal plate (e.g., those of stainless steel, aluminum, etc.), but in this embodiment, a pen input display apparatus 100 is prepared in the same manner as in First Embodiment except that the TFT substrate 2 is formed of the shape memory material such as the Ti—Ni alloy etc., i.e., the shape memory material functions as not only the frame 4 but also the TFT substrate 2. The Ti—Ni alloy is controlled similarly as in First or Second Embodiment described above.

According to this embodiment, it is possible to eliminate the need for the use of the plastic film or the thin metal plate, so that it becomes possible to reduce a thickness and a weight of the resultant display apparatus by that much.

FOURTH EMBODIMENT

In the above embodiments, the rigidity control is performed so that the rigidity of the pen input display apparatus 100 is ensured when the pen input is effected in such a state that the apparatus is not placed on the desk. However, even when the pen input is not effected, the ensuring of rigidity may be effected, if needed.

In this embodiment, an icon of "display" is displayed on the display screen 1a and the frame 4 is energized or heated when the input pen 5 contacts the icon portion. An energization switch or a heating switch may be provided to an appropriate portion other than the display screen.

In this case, a timing means (timer) is provided in the pen input display apparatus 100 and such a control that the energization or heating is stopped when a predetermined time has elapsed may be effected. As a result, it is possible to prevent excessive continuous energization or heating, thus resulting in reduction of power consumption. For example, when the user wishes to view the display contents such as a state of memory in such an environment that the display apparatus 100 is stood with no hand or in an outdoor strong wind condition, the display surface does not fall down by bending thereof and does not flutter, thus ensuring viewability.

From such a viewpoint, this pen input display apparatus 100 may be a display apparatus only for effecting display of data from a memory, a removable memory or external equipment such as a (personal) computer connected to the display apparatus. For example, the display apparatus of this type is realized by omitting the sensor substrate 3 and the input pen 5 from the structure shown in FIG. 2. The resultant display apparatus has such a structure that it has flexibility and is readily bendable except when the rigidity is required, so that the display apparatus can be end or rolled at the time of carrying or accommodating the apparatus. In this case, the rigidity adjusting means is typically controlled by turning the switch on or off.

FIFTH EMBODIMENT

Figure 5:
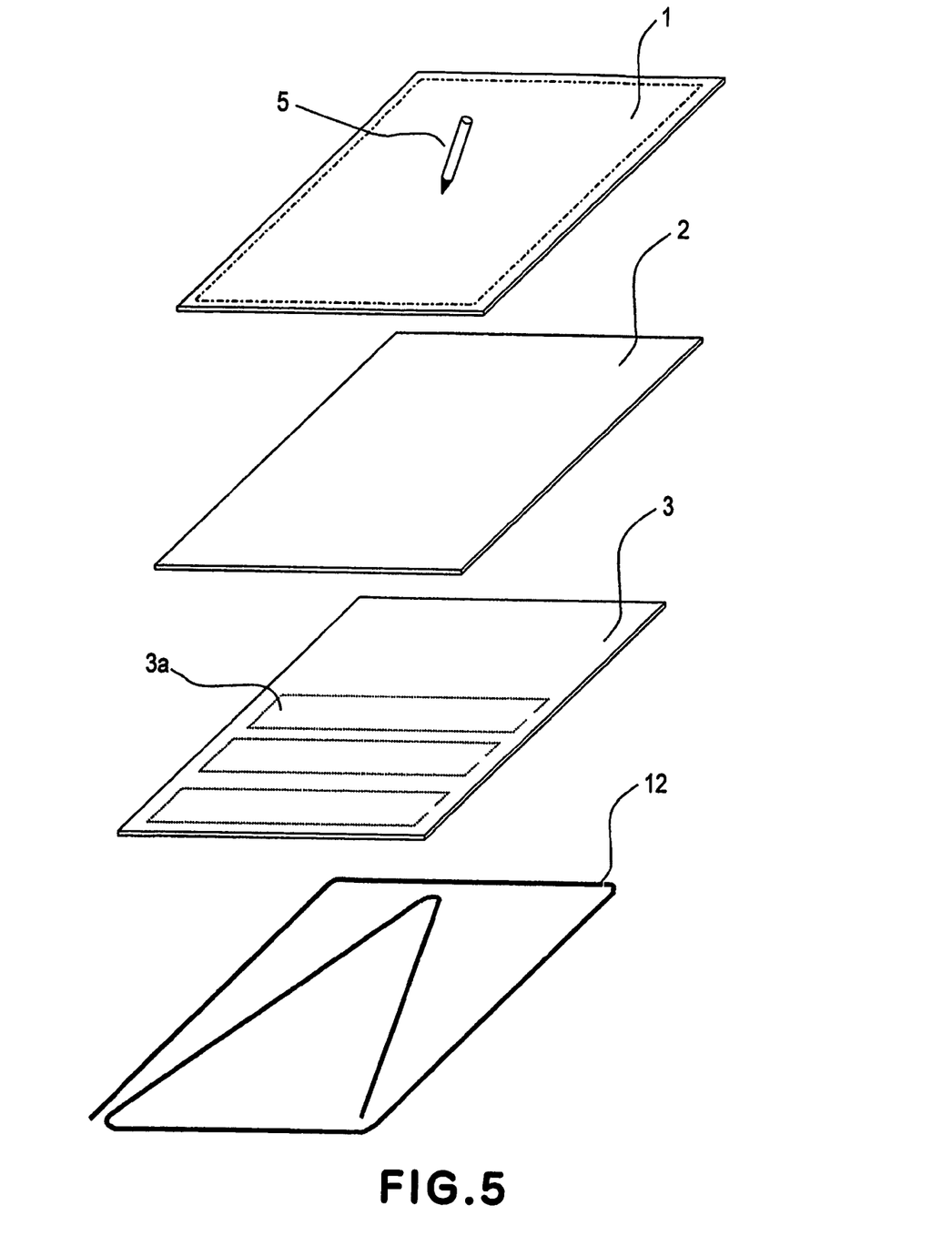
FIG. 5 is another exploded perspective view of an embodiment of the present invention.

In the above embodiments, the frame 4 is formed of the plate-like Ti—Ni alloy or the like. However, in this embodiment, the frame 4 is formed of a wire-like (bar-like) Ti—Ni alloy or the like. FIG. 5 shows a pen input display apparatus using such a structure, wherein a frame 12 is prepared by bending a bar-like member having a circular cross section. Similarly as in the case of FIG. 2, a fixing portion and a wiring portion are omitted.

The frame 12 is disposed on the back side of the sensor substrate 3 but may be disposed on the front side thereof, i.e., between the TFT substrate 2 and the sensor substrate 3 so long as it does not adversely affects a detection ability of the input pen 5. This is true for the structure shown in FIG. 2. When the frame 12 is fixedly connected with the respective portions, a portion which is not intended to be electrically connected with the frame 12 may be connected via an insulating member formed of, e.g., polyester. Alternatively, the frame 12 may be coated partially with an insulating material. The control method of the Ti—Ni alloy or the like is the same as in First, Second and Fourth Embodiments described above.

SIXTH EMBODIMENT

In the above embodiments, the frames 4 and 12 for formed of the shape memory material such as the Ti—Ni alloy or the like.

Figure 6:
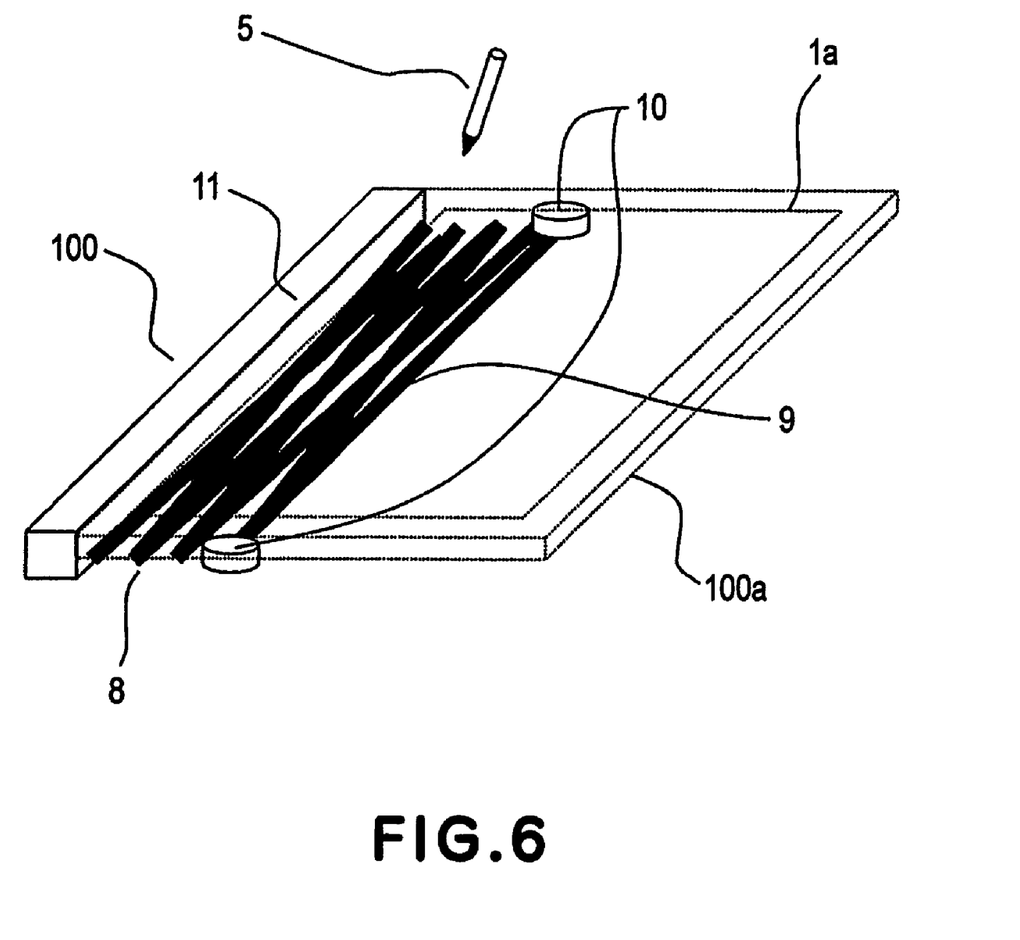
FIG. 6 is another perspective view of an embodiment of the input display apparatus, of the present invention, placed in a flexible state.
Figure 7:
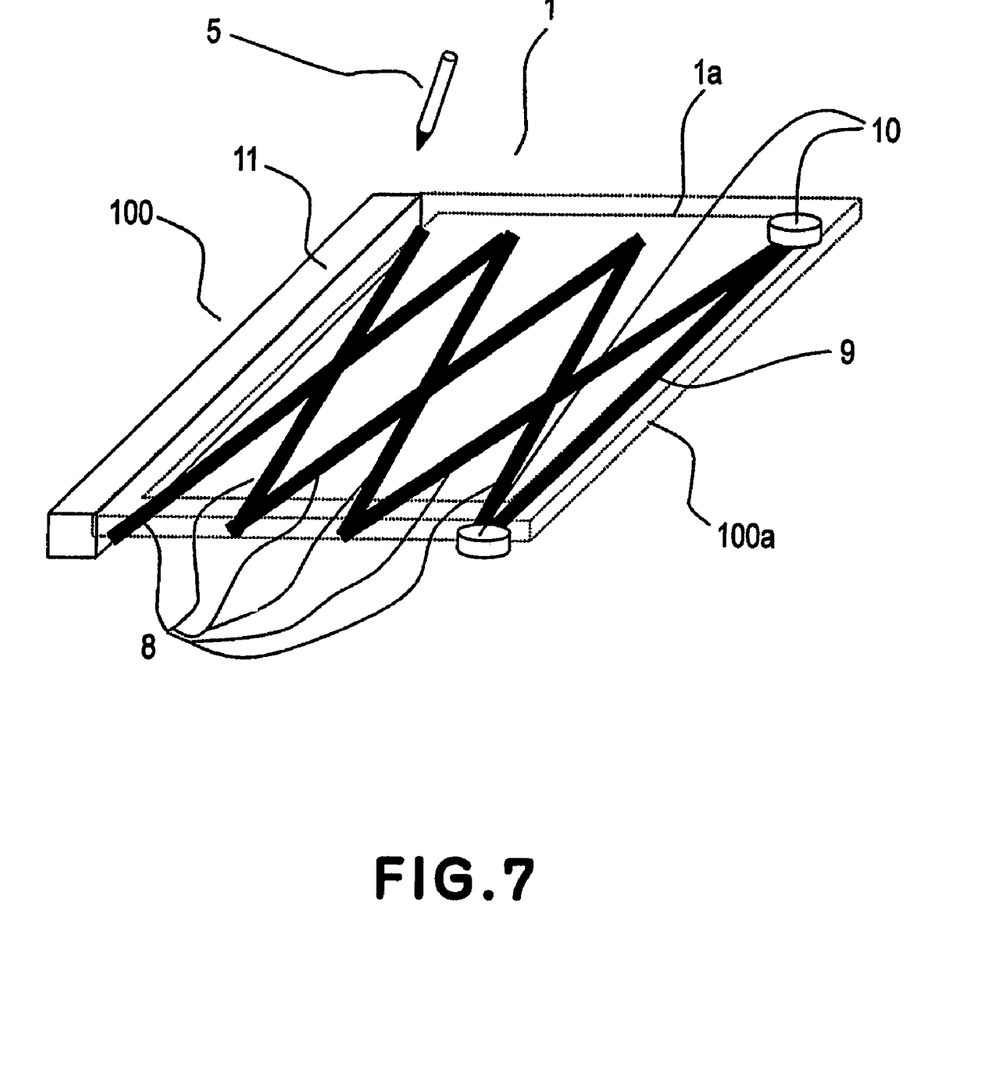
FIG. 7 is a perspective view of the input display apparatus shown in FIG. 6 in such a state that the apparatus has rigidity.

In this embodiment, an ordinary metal or resin material is used. FIGS. 6 and 7 show a pen input display apparatus using the metal or resin material constituting a link.

In FIGS. 6 and 7, a pen input display apparatus 100 includes a housing portion 100a, indicated by dotted lines, including a display surface 1a, a TFT substrate 2, and a sensor substrate 3.

FIG. 6 shows such a state that the pen input display apparatus 100 does not require rigidity. In FIG. 6, a link member 8 is disposed on the back side of the display portion 1a and is formed of a bar-like or plate-like metal or resin. In FIG. 6, the link members 8 are folded up and are not connected with the dotted portion 100a, so that the dotted portion 100a is bendable. The control box 11 is the same as in First Embodiment. The control box 11 and the leftmost end of the link members 8 are rotatably fixed with each other. A handle portion 9 is held with a hand when the link member 8 are pulled rightward from the state shown in FIG. 6.

FIG. 7 shows such a state that the link member 8 are completed pulled out. In FIG. 7, magnets 10 are fixed at the both ends of the handle portion 9 and designed to face an unshown iron plate at the rightmost end of the dotted portion 100*a*, thus being fixed to the iron plate. The iron plate may be disposed opposite to the magnets 10 only when the magnets 10 are located at the positions shown in FIG. 7 or disposed at plural points, in a magnet moving area, at which the magnets 10 can be fixed to the iron plate. Alternatively, the iron plate may be disposed continuously in the magnet moving area, so that it can be connectable to the magnets 10. In this case, the iron plate is made sufficiently thin, thus having flexibility. The arrangement of the iron plate may be determined depending on whether or not the display and input portion 200 is intended to be provided with rigidity at an associated position.

Figure 8:
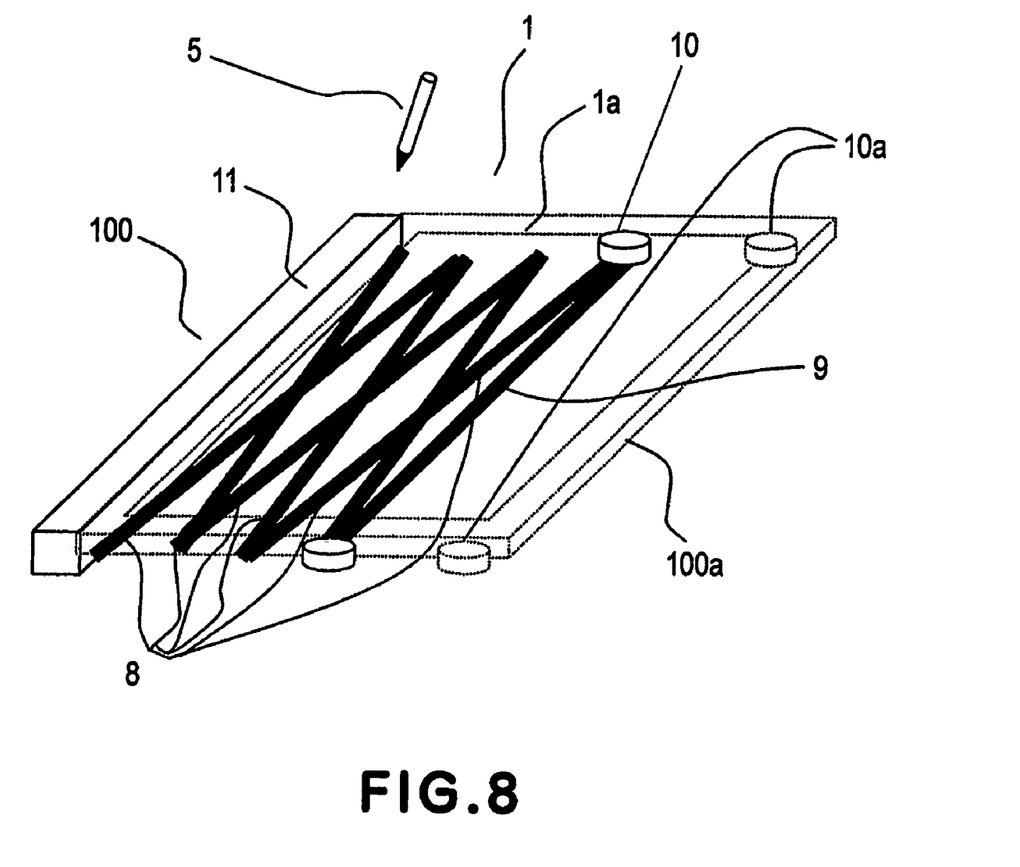
FIG. 8 is a perspective view of the input display apparatus shown in FIG. 6 in such a state that about half of the apparatus has rigidity.

FIG. 8 shows such a state that an unshown iron plate is disposed, at an intermediary position between these in the states shown in FIGS. 6 and 7, so as to be connectable to the magnets 10. A dotted line 10*a* represents the positions of the magnets 10 in the state shown in FIG. 7. In the state shown in FIG. 8, the dotted portion 100*a* located on the right-hand side from the positions of the magnets 10 is bendable. A fixing method between the link members 8 and the dotted portion 10*a* is not limited to one using the magnets 10 but may be an ordinary fixing method such as snap-fitting.

In the state shown in FIG. 7, the joint portions connecting the link members 8 to each other have a known locking mechanism (e.g., such a mechanism that a small ball is provided at the surface of each joint portion to be spring biased and locks an associated link member 8 in a somewhat protruded state) and are held so as not to be rotated by a weak force, so that they are not folded up even when the user accidentally applies a force to the handle portion 9. When a certain degree of force is applied to the handle portion 9, the locking mechanism is released (e.g., in the above described case, the small ball to be spring biased is pushed under the surface of joint to release the locking mechanism). As a result, it becomes possible to return the link members 8 to the state shown in FIG. 6.

The locking mechanism varies in structure depending on the number of points at which the linking members 8 are held. In the case where the magnets are fixed to the iron plate at plural points as described above, the locking mechanism may be designed so that it can be held at plural points corresponding to the plurality of fixing points. In the case of continuously disposing the iron plate, such a hinge-like member, which is not movable so long as a certain degree of force is always applied thereto when the link members 8 are moved, may be adopted as the joint portions.

In this embodiment, the link members 8 may be pulled out when the user effects pen input or when necessary. Accordingly, in this embodiment, it is not necessary to employ the detection means, the timing means, and the switches as described in First Embodiment. In the case of this embodiment, the display surface 1*a* is fixed by the link members 8 at both ends through the magnets, so that it is possible to prevent the deformation of the apparatus.

The link members 8 described above may also be used in such a display apparatus, described in Fourth Embodiment, that it is only used for displaying the data from the memory, the removable memory, or the external equipment (e.g., the computer), connected to the apparatus.

SEVENTH EMBODIMENT

In the above described embodiments, as the pen input scheme, the electromagnetic induction scheme is employed.

In this embodiment, an air ultrasonic scheme is used instead of the electromagnetic induction scheme.

More specifically, different from the structure of the pen input display apparatus in the above described embodiments, the sensor substrate 3 is omitted. Further, an ultrasonic transmitter is provided at the pen point and an ultrasonic receiver is provided to the control box (11 shown in FIG. 1) at two points (not shown).

In this embodiment, other structures of the pen input display apparatus 100 and the link members 8 (used in Sixth Embodiment) and the control of the shape memory material are the same as those in the above described embodiments.

OTHER EMBODIMENTS

Figure 9:
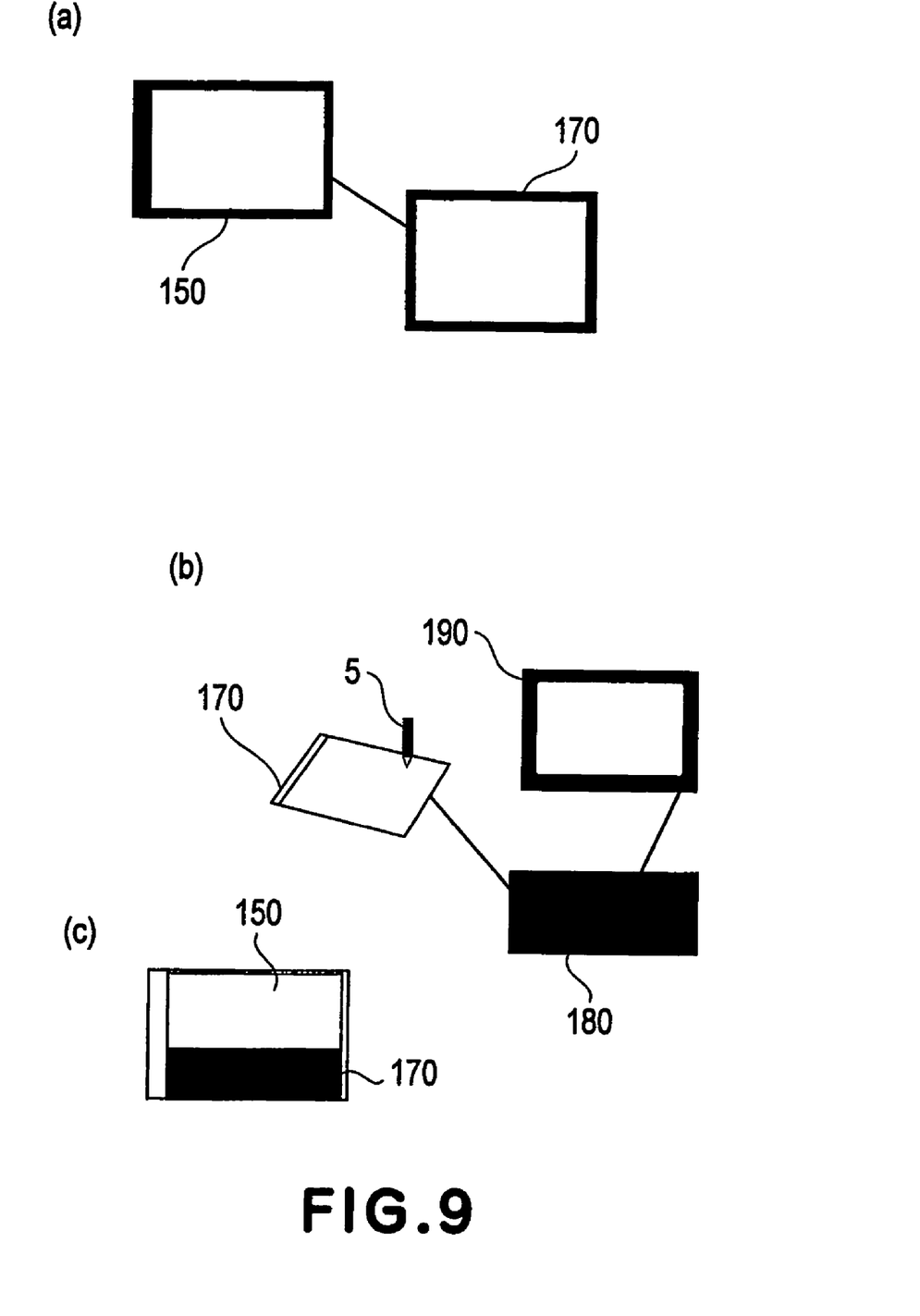

In the above described embodiments, the sheet-like display and input portion includes the display portion and the input portion which overlap each other when viewed from the user's line of sight but may include an input portion 170 and a display portion 150 which are separately disposed and communication therebetween is ensured through wire or wireless communication. More specifically, this structure is such a structure that the portions 1 and 2 shown in FIG. 2 are disposed separately from the portion 2 shown in FIG. 2. Further, at least one of the input portion 170 and the display portion 150 is provided with a mechanism such as the frame 4 or 12 or the link members 8. In this embodiment, a character or the like inputted from the input portion 170 is displayed at a corresponding portion of the display portion 150. Further, the pen input scheme may be changed to a keyboard input scheme. In this case, a known keyboard input technique may be used. When a main switch is turned on, a keyboard pattern is divided into an input portion 170 and a display portion 150 at a predetermined or variable areal ratio therebetween as shown in FIG. 9(*c*). IN the case of dividing the portions 170 and 150 at the predetermined areal ratio, the resultant structure is, e.g., the same as such a structure that the portions 2 and 3 shown in FIG. 2 are arranged in the same plane at the predetermined areal ratio. In the case of the variable areal ratio, the structure shown in FIG. 2 is retained as it is and effective functional parts of the portions 2 and 3 may be designed to have the variable areal ratio by, e.g., switching. In these cases, it is possible to employ the keyboard input scheme in place of the pen input scheme or employ the switchable input scheme by, e.g., switching.

In the embodiments shown in FIGS. 9(*a*) to 9(*c*), an associated control portion for controlling input and display may be provided. At such a control portion, e.g., such a reconstruction that wiring to necessary portion(s) is performed and wiring to unnecessary portion(s) is removed, as needed, and inputted data may be processed appropriately depending on respective cases to be displayed at an appropriate portion.

Also in the embodiments shown in FIGS. 9(*a*) to 9(*c*), as the rigidity adjusting means, an appropriate means such as the frame 4 or 12 or the displayed, e.g., by use of a liquid crystal material at the input portion 170, and pushing of respective bottom portions is detected according to, e.g., a resistive film scheme and displayed is performed at the display portion 150. In this embodiment, the structure and the control become complicate but it also becomes possible to employ a switching mechanism so as to permit a switchable input scheme. Also in these embodiments, the display portion and the input portion may be bent or rolled as a convenience to the user when the apparatus is held, carried, or accommodated. At the display portion in these embodiments, the rigidity adjusting means may be typically controlled by turning the switch on or off.

Further, the portions 3 and 4 shown in FIG. 2 may be used to constitute an input apparatus 170 as shown in FIG. 9(*b*) wherein the input apparatus 170 communicates with a computer 180 through wire or wireless communication to display inputted data on a display 190. The input apparatus 170 may be accommodated in an appropriate place by folding or rolling the apparatus 170 when it is not used. In this case, it is also possible to employ the keyboard input scheme instead of the pen input scheme or employ the switchable input scheme through switching.

Further, the sheet-like display and input portion may include an in-plane surface which is link members 9 described in the above First to Seventh Embodiment, depending on the structures.

Further, in the above described embodiments, it is also possible to use such a frame member, like the frame 4 shown in FIG. 2, that a substance containing a polymer capable of sol-gel transition (a polymer which is in a sol state at a normal temperature but is gelated by heating) is placed in a sheet-like bag. Further, as an input scheme other than those described above, it is also possible to use such a scheme that a heat source receiver is disposed at two points and input is performed with a stick containing therein a heat source, generating, e.g., infrared ray, which can be turned on or off or with a finger of the user.

INDUSTRIAL APPLICABILITY

As described hereinabove, the apparatus according to the present invention includes a sheet-like member which has rigidity only when required for input or display and can be bent or rolled at other times, so that the apparatus is convenient to be held, carried or accommodated. Further, it becomes possible to obviate such a trouble that an underlay for the apparatus is always carried together with the apparatus.

I claim:

1. An apparatus for effecting at least one of display and input, comprising:
    a flexible sheet-like member for effecting at least one of display and input, and
    a rigidity adjusting means for changing at least partially a rigidity of said flexible sheet-like member, and
    first detection means for detecting that said sheet-like member is not placed on a surface having a certain degree of rigidity,
    wherein said rigidity adjusting means is not controlled to ensure rigidity necessary for said sheet-like member unless, at least, said first detection means detects that said sheet-like member is not placed on a surface having the certain degree of rigidity.

2. An apparatus according to claim 1, wherein said sheet-like member comprises an input portion and a display portion which substantially overlap each other to provide a unit when viewed from a direction of a user's line of sight.

3. An apparatus according to claim 1, wherein said rigidity adjusting means comprises a control portion and a rigidity adjusting member attached to the sheet-like member, said rigidity adjusting member being formed of a variable-rigidity material.

4. An apparatus according to claim 1, wherein said apparatus further comprises second detection means for detecting start of input, and said rigidity adjusting means is not controlled to ensure rigidity necessary for said sheet-like member unless, at least, said second detection means detects start of input.

5. An apparatus according to claim 1, wherein said apparatus further comprises third detection means for detecting stop of input, and said rigidity adjusting means is controlled to return said sheet-like member to a flexible state when said third detection means detects stop of input when said rigidity adjusting means is in a state such that rigidity necessary for said sheet-like member is ensured.

6. An apparatus according to claim 1, wherein said apparatus further comprises means for controlling timing of ensuring and/or losing rigidity necessary for the sheet-like member.

7. An apparatus according to claim 1, wherein said first detection means detects a state of said sheet-like member to control said rigidity adjusting means even while input is performed.

8. An apparatus according to claim 1, wherein said rigidity adjusting means comprises a movable mechanism which can be placed in such a state that it does not impair flexibility of said sheet-like member and is movable in an area capable of at least partially ensuring rigidity of said sheet-like member.

9. An apparatus according to claim 3, wherein said apparatus is at least an apparatus for effecting display, and said rigidity adjusting member also functions as a base portion of drive means for driving said apparatus.

10. An apparatus according to claim 4, wherein said rigidity adjusting member is controlled to ensure rigidity necessary for said apparatus if said first detection means detects that said sheet-like member is placed on the surface having the certain degree of rigidity and said second detection means detects start of input.

* * * * *